United States Patent [19]

Kim

[11] Patent Number: 5,701,440
[45] Date of Patent: Dec. 23, 1997

[54] MULTI-PROCESSOR SYSTEM PROVIDED WITH BUS CONTROL MODULE

[75] Inventor: Chang-yong Kim, Seoul, Rep. of Korea

[73] Assignee: Samsung Electronics Co., Ltd., Kyungki-do, Rep. of Korea

[21] Appl. No.: 424,002

[22] Filed: Apr. 18, 1995

[30] Foreign Application Priority Data

Jan. 19, 1995 [KR] Rep. of Korea ............. 95-845

[51] Int. Cl.$^6$ ............................................. G06F 9/455
[52] U.S. Cl. ............. 395/500; 395/200.01; 395/200.08; 395/200.14; 395/285; 395/307; 370/466; 370/467; 370/469
[58] Field of Search ................. 395/500, 800, 395/700, 375, 200.01–200.2, 285, 307, 308, 309, 501, 523, 326, 330, 331, 653, 280, 281, 284, 287, 306, 821–824, 831, 882–886, 376–379; 370/85.1, 85.11, 110.1, 49.5, 357–359, 400, 419–420, 462–469, 472–473

[56] References Cited

U.S. PATENT DOCUMENTS

| | | | |
|---|---|---|---|
| 5,224,098 | 6/1993 | Bird et al. | 395/800 |
| 5,291,489 | 3/1994 | Morgan et al. | 395/500 |
| 5,388,215 | 2/1995 | Baker et al. | 395/700 |
| 5,404,482 | 4/1995 | Stamm et al. | 395/472 |
| 5,406,557 | 4/1995 | Baudoin | 395/200.18 |
| 5,420,991 | 5/1995 | Konigsfeld et al. | 395/375 |
| 5,425,028 | 6/1995 | Britton et al. | 395/800 |
| 5,452,420 | 9/1995 | Engdahl et al. | 395/309 |
| 5,452,433 | 9/1995 | Nihart et al. | 395/500 |
| 5,490,252 | 2/1996 | Macera et al. | 395/200.01 |
| 5,497,373 | 3/1996 | Hulen et al. | 395/500 |
| 5,530,965 | 6/1996 | Kawasaki et al. | 395/800 |
| 5,535,373 | 7/1996 | Olnowich | 395/500 |
| 5,612,953 | 3/1997 | Olnowich | 370/367 |

OTHER PUBLICATIONS

Leighton et al "Universal Packet routing Algorithms", Jan. 1988 IEEE.

*Primary Examiner*—Jacques Louis-Jacques
*Attorney, Agent, or Firm*—Leydig, Voit & Mayer, Ltd.

[57] ABSTRACT

A multi-processor system having a bus control module for enabling data transmission between different processors and enhancing system bus stability, includes a multitude of processor boards for sharing data via a system bus. Each processor board is provided with a processor for transmitting or receiving data signal together with a specific information signal that fits a specific protocol, and a bus control module for converting the specific information signal of the processor into a common information signal and transmitting the result to the system bus together with the data signal, and converting the common information signal transmitted from the system bus into a specific information data appropriate to the processor and transmitting the result to the processor together with the data signal, to thereby convert the specific information signal into common information signals TT, TS and LOA and perform data transmission and reception.

1 Claim, 4 Drawing Sheets

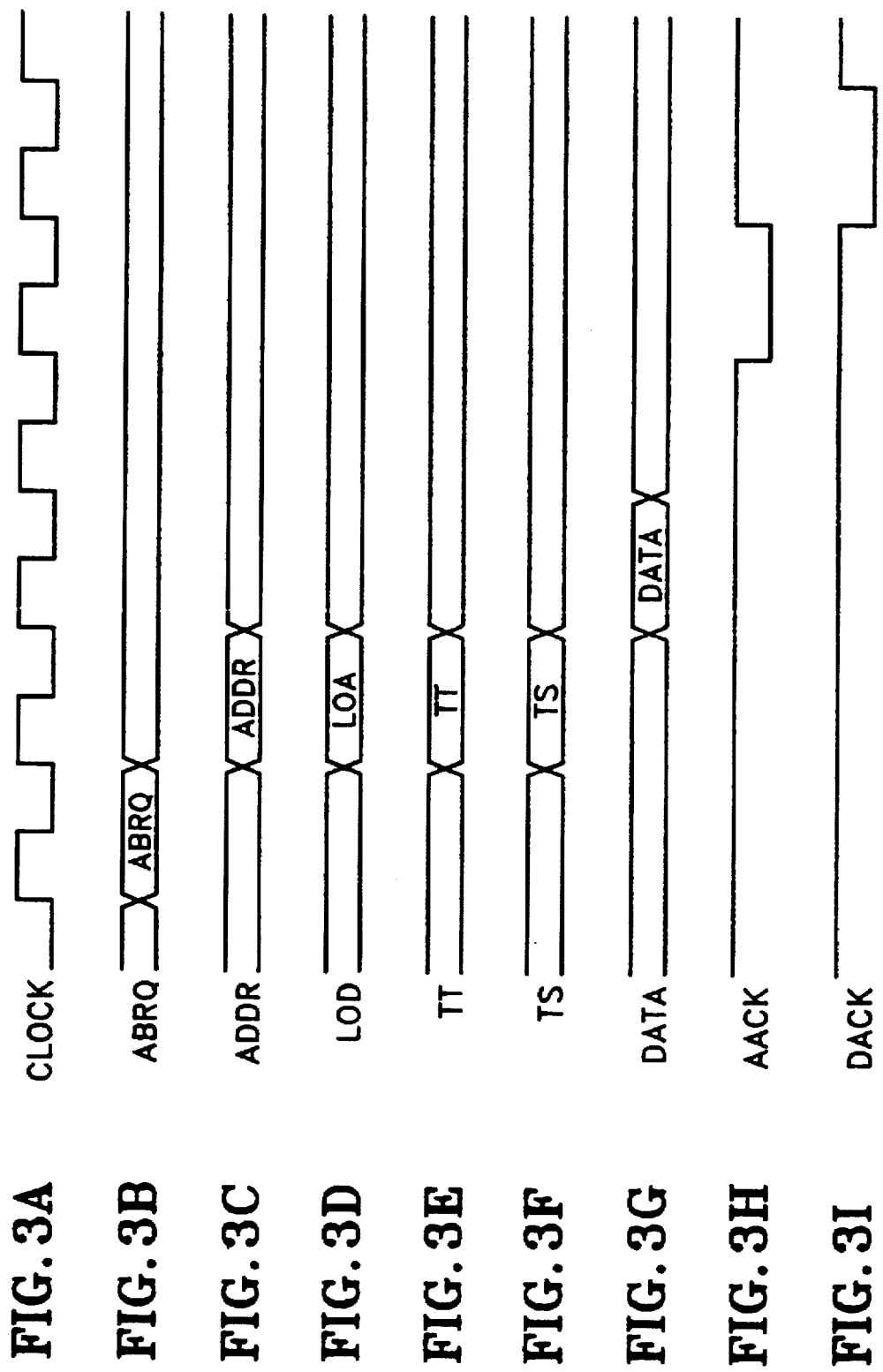

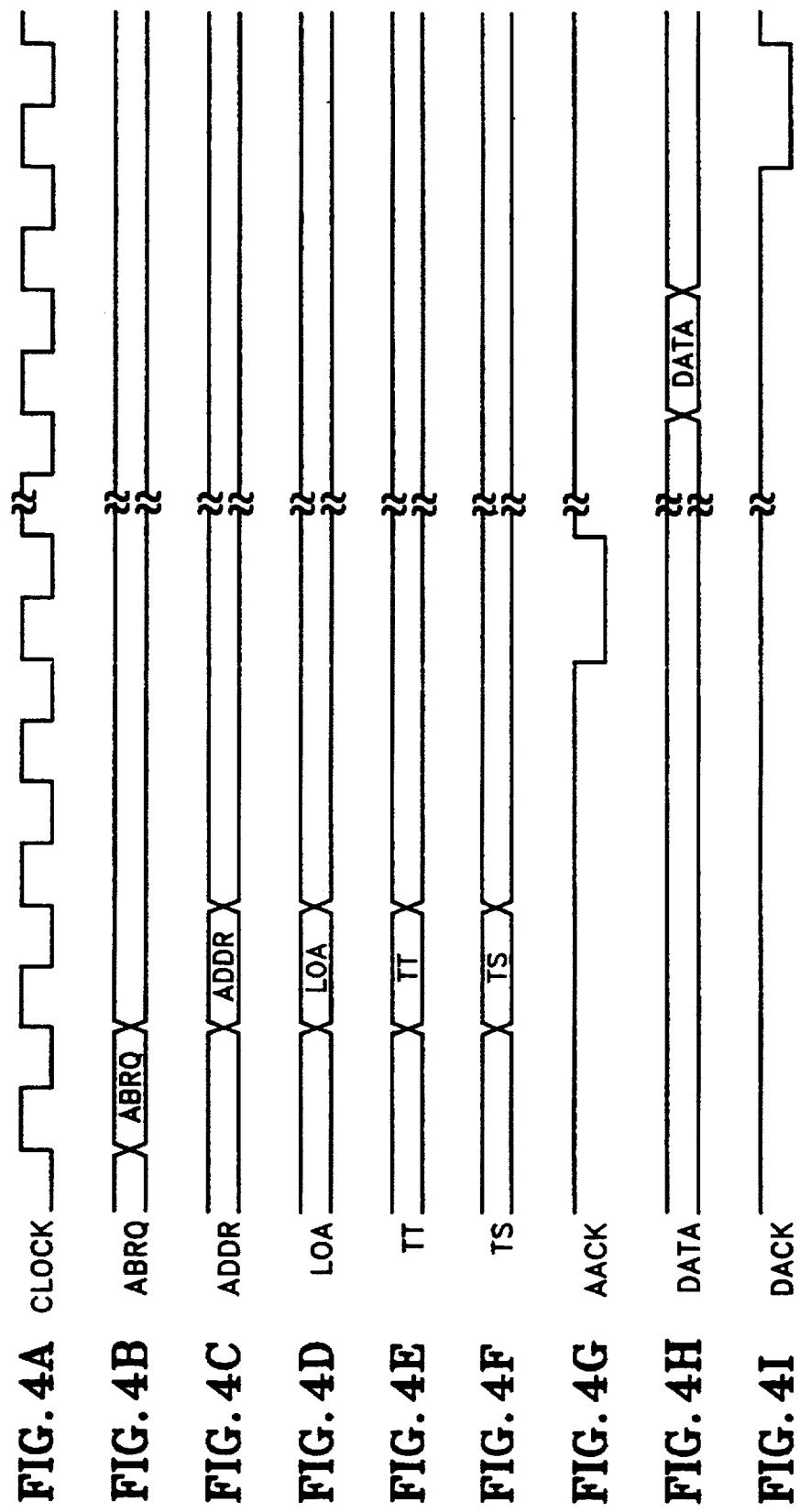

MULTI-PROCESSOR SYSTEM PROVIDED WITH BUS CONTROL MODULE

BACKGROUND OF THE INVENTION

The present invention relates to a multi-processor system provided with a bus control module, and more particularly, to a multi-processor system comprising a bus control module for enabling data transmission between different processors by means of newly realizing data bus transmission protocol of a computer system and enhancing the stability of a system bus.

The data buses used in the system buses of conventional main processors II and III have 64-bit and 128-bit capability, respectively. The main processor II performs data transmission between boards by using a transmission data (64 bits) and a byte mask signal (8 bits). The byte mask signal is added in order to display the data size (64 bits) to be transmitted and the effectiveness of data and consists of one byte mask bit per data byte. The main processor III performs data transmission between boards by using transmission data (128 bits) and the byte mask signal which is added in correspondence to 128-bit data, that is, sixteen bits in total.

As a system bus functions at high speed with a large data volume, a circuit for controlling the bus becomes complicated. In addition, the number of elements increases, inevitably, according to an increase in the number of signal lines, which affects the overall system.

In general, medium- and large-sized computers are provided with various boards for performing characteristic functions in a system, for example, a processor board for controlling the entire system, an input/output control board for controlling input/output of data and a memory board for controlling data storing function, and each board needs processors comprising specific functions.

However, since each board provided to a conventional medium- and large-sized computer may employ a processor produced by the same manufacturer, a circuit for controlling a bus is complicated and the number of signal lines needed is excessive.

SUMMARY OF THE INVENTION

Accordingly, it is an object of the present invention to provide a multi-processor system having a bus control module that enables a compatible data transmission between processors in a computer system using various processors.

To accomplish the above object, there is provided a multi-processor system which comprises a multitude of processor boards having different protocols and sharing data via a system bus, wherein each processor board comprises a processor for transmitting or receiving a data signal together with a specific information signal that fits a specific protocol, and a bus control module for converting the specific information signal of the processor into a common information signal and transmitting the result to the system bus together with data signal, and converting the common information signal transmitted from the system bus into a specific information data appropriate for the processor and transmitting the result to the processor together with data signal.

BRIEF DESCRIPTION OF THE DRAWINGS

The above objects and other advantages of the present invention will become more apparent by describing in detail a preferred embodiment thereof with reference to the attached drawings in which:

FIG. 3A to FIG. 3I constitute a timing diagram showing a time frame when a "write" command is given to the system shown in FIG. 2; and FIG. 4A to FIG. 4I constitute a timing diagram showing a time frame when a "read" command is given to the system shown in FIG. 2.

DETAILED DESCRIPTION OF THE INVENTION

Figure 1:
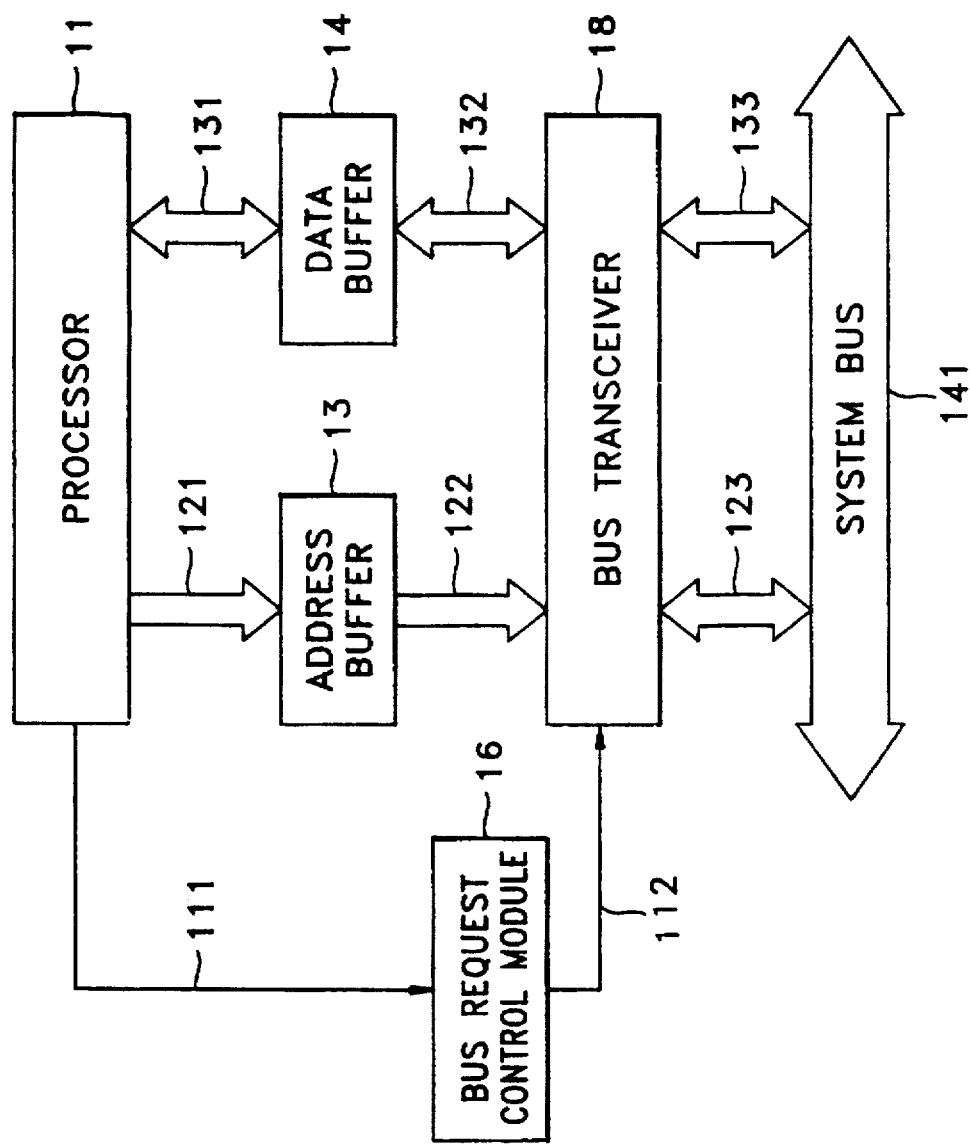
FIG. 1 is a block diagram illustrating a conventional processor system.

FIG. 1 is a block diagram showing a conventional processor system. The conventional processor system uses a processor having unified transmission characteristic so that the processor can be used without a control with respect to a data mask under the limited format.

The conventional processor system comprises a processor 11 for processing data and addresses in order to transmit/receive data by receiving a right to use a system bus, an address buffer 13 for storing an address output from processor 11, a data buffer 14 for storing data output from processor 11, a bus request control module 16 for receiving a bus request signal 111 from processor 11 and generating a bus control signal 112 for controlling a right to use the bus, and a bus transceiver 18 for transmitting/receiving an address and data via a system bus 141. In FIG. 1, reference numerals 121, 122 and 123 denote address buses, and reference numerals 131, 132 and 133 denote data buses.

When data transmission is performed via a data bus in a predetermined processor system, processor 11 obtains a right to use a bus according to the control of bus request control module 16 in a board. Processor 11 having a right to use a bus transmits the data size and a byte mask signal suitable for a protocol of a processor to system bus 141 via bus transceiver 18. Here, the processor as an object of transmitting/receiving data via system bus 141 that has a unified characteristic. Therefore, the data transmitted by the same transmission protocol can be received without conversion. That is, each board of the processor system has to use processors having the same characteristics so as to transmit and receive data between boards.

Figure 2:
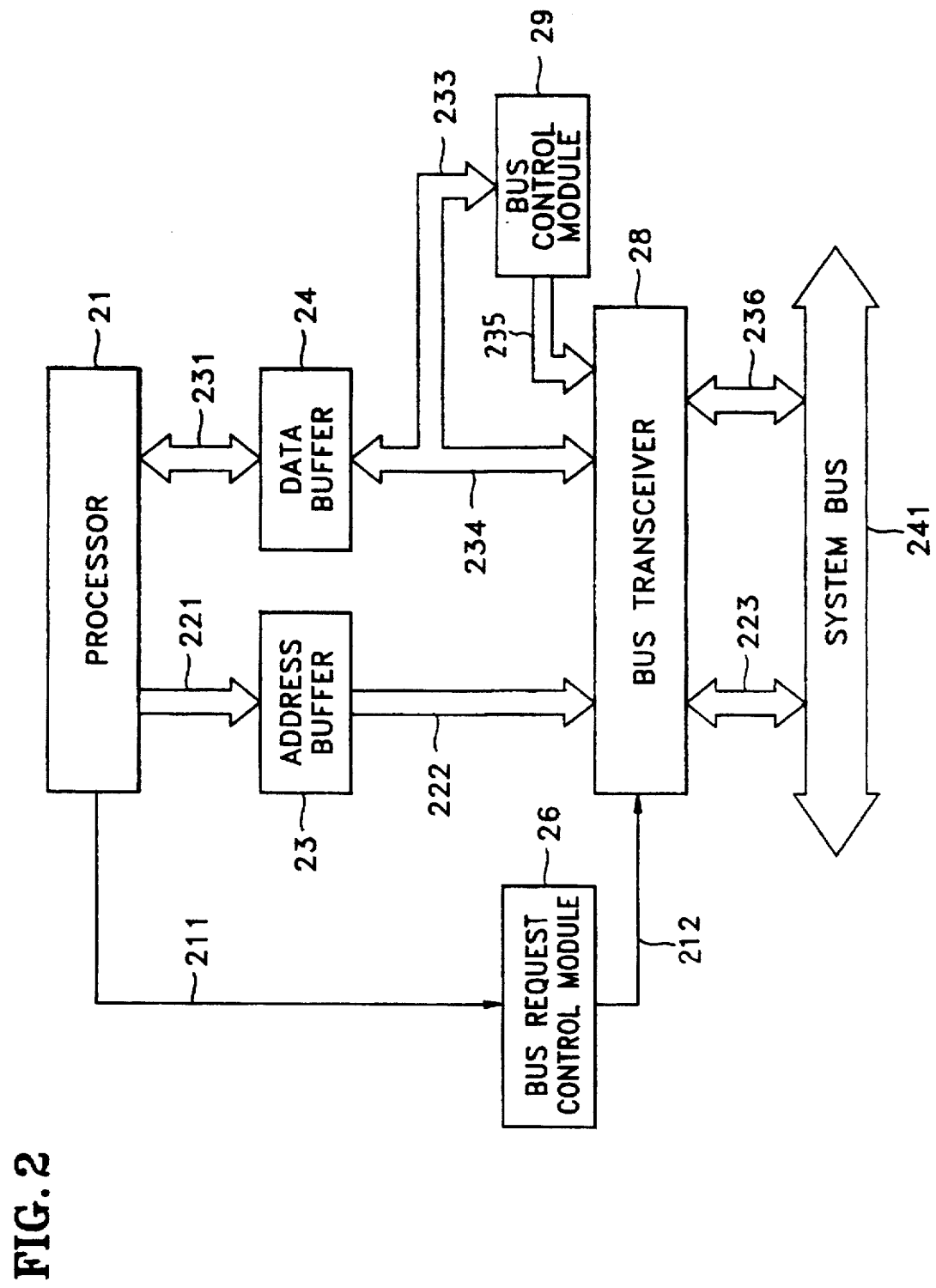
FIG. 2 is a block diagram illustrating a multi-processor system comprising a bus control module of the present invention.

FIG. 2 is a block diagram illustrating a multi-processor system comprising a bus control module of the present invention. The multi-processor system includes a processor 21 for processing data and addresses in order to transmit/receive data by receiving a right to use a system bus, an address buffer 23 for storing an address output from processor 21, a data buffer 24 for storing data output from processor 21, a bus request control module 26 for receiving a bus request signal 211 from processor 21 and generating a bus control signal 212 for controlling a right to use the bus, a bus transceiver 28 for transmitting/receiving an address and data via a system bus 241, and a bus control module 29 for satisfying a data transmission format and simultaneously enabling data transmission between processors having different transmission characteristics. In FIG. 2, reference numerals 221, 222 and 223 denote address buses, reference numerals 231, 234 and 236 denote data buses, reference numeral 233 denotes a byte mask bus, and reference numeral 235 denotes a bus transceiver control bus with respect to byte mask bus 233 of bus control module 29.

The present invention can be applied to the case where data transmission is performed among a plurality of boards provided with processors employing different transmission protocols. For example, the present invention can be applied to the data transmission between a board employing an Intel pentium processor and a board employing a Sun microprocessor.

When a specific processor board, for example, a board employing an Intel pentium processor, transmits data via data bus 241, processor 21 obtains a right to use the bus according to a control of bus request control module 26 provided to the board.

Processor 21 having a right to use a bus outputs a data signal (128 or 64 bits) and byte mask signal (16 or 8 bits) suitable for a specific protocol of the corresponding processor to data buffer 24. The data from data buffer 24 is output to bus transceiver 28. In addition, the byte mask signal output from data buffer 24 is output to bus transceiver 28 via bus control module 29.

Bus control module 29 converts the input byte mask signal into a protocol type suitable for the corresponding processor (say, a Sun microprocessor) and outputs the result to bus transceiver 28. The process for converting the byte mask signal by bus control module 29 has to be performed within the time period for transmitting a byte mask signal to a system bus without change in the conventional technique illustrated in FIG. 1. In other words, bus control module 29 has to convert data into a protocol type suitable for a receiver board before a processor employing system bus 241 requests use of a bus with respect to bus request control module 26.

When the time needed for a protocol converting is added to a system bus format, the total system performance may be degraded. Therefore, the byte mask signal transmitted from processor 21 is controlled at an address cycle so that a data mask signal can be prepared stably within the next data cycle.

FIG. 3A to FIG. 3I illustrate a time format for a case where data is transmitted from processor 21 to system bus 241 shown in FIG. 2.

An address, transfer type (TT), transfer size (TS) and low-ordered address (LOA) are driven at the same cycle on system bus 241 (as shown in FIG. 3C to FIG. 3F), and the data is driven at the next cycle (FIG. 3G). Then, a response board transmits an address acknowledge (AACK) signal with respect to an address driven two cycles later than the point where data is driven by a board that requests a transmission (FIG. 3H), and a data acknowledge (DACK) signal with respect to the data is transmitted at the next cycle (FIG. 3I).

FIG. 4A to FIG. 4I illustrate a time format for a case where the processor shown in FIG. 2 reads data of system bus.

An address, transfer type (TT), transfer size (TS) and low-ordered address (LOA) are driven at the same cycle on system bus 241 (as shown in FIG. 4C to FIG. 4F). Then, a response board transmits an address acknowledge (AACK) signal with respect to an address driven two cycles later than the point where data is driven by a board that requests a transmission (FIG. 4G). Then, the board that requests data waits until the data is transmitted, and when the requested data is transmitted (FIG. 4H), a data acknowledge (DACK) signal with respect to the data is transmitted (FIG. 4I).

The above-described operation can be performed by obtaining a right to use a bus depending on a priority of arbitration requests (ABRQ) with respect to the boards on system bus 241 according to a control of bus request control module 26 that requests the use of the bus prior to the start of various cycles for transmitting an address and data.

Table 1 shows inputting an information signal, i.e., byte mask signal, used for an Intel pentium processor, and converting the input signal into an information signal used for a Sun microprocessor, i.e., common information signals (TT, TS) designating data size, in order to enable data transmission between the boards provided with the respective microprocessors. That is, data size to be transmitted between each board is determined by 3-bit TS and 1-bit TT.

TABLE 1

| number | TS[2...0] | TT = 0 | TT = 1 |
|---|---|---|---|
| 1 | 000 | 8 bytes | 16 bytes |
| 2 | 001 | 1 bytes | 32 bytes |
| 3 | 010 | 2 bytes | 64 bytes |
| 4 | 011 | 3 bytes | 128 bytes |
| 5 | 100 | 4 bytes | 256 bytes |
| 6 | 101 | 5 bytes | 512 bytes |
| 7 | 110 | 6 bytes | 1024 bytes |
| 8 | 111 | 7 bytes | 2048 bytes |

Here, "TS" is a signal for designating data size, and "TT" is a signal for designating a data type. Also, if TT is 0, the data of processor 21 is single-transmitted to system bus 241, and if TT is 1, the data is block-transmitted to system bus 241.

According to a conventional method, data size is designated as sixteen bits of byte mask bit for the case of a system whose data size is 128 bits. However, in the present invention, as shown in Table 1, bus control module 29 converts byte mask signal into 1-bit TT and 3-bit TS so as to designate data size, to thereby reduce the number of signal lines of system bus. In Table 1, data size is designated; however, it is not shown from which data bit line of system bus 241 an effective data is transmitted/received.

Table 2 shows a low-ordered address (LOA) for recognizing the start of the effective data line of system bus by employing three bits of an address line.

TABLE 2

| number | /BM[7...0] | LOA[2...] |
|---|---|---|
| 1 | xxxxxxx1 | 000 |
| 2 | xxxxxx10 | 001 |
| 3 | xxxxx100 | 010 |
| 4 | xxxx1000 | 011 |
| 5 | xxx10000 | 100 |
| 6 | xx100000 | 101 |
| 7 | x1000000 | 110 |
| 8 | 10000000 | 111 |

In Table 2, one bit of byte mask signal (BM[7..0]) is a byte unit of a data line of a data bus and the relationship between the byte mask signal (BM) output from processor 21 of FIG. 2 and the transmission array address (that is, LOA) is shown. For example, if the data size is four bytes, bus controller 29 inverts BM[7..0] signal input as a binary "0000 1111" and generates a binary "1111 0000." If such a value is applied to Table 2 and a scanning is performed, the result corresponds to the /BM[7..0] value of a binary "xxx1 0000," i.e., the fifth row of Table 2 and an LOA value is 100. Accordingly, data can be transmitted to a system bus at a time by using the 63th to 32th data lines. In four-byte transmission, if a processor requires the transmission and reception of effective data, for example, "1111 0000," bus controller 29 inverts byte mask signal (BM) input as "1111 0000," to thereby generate the /BM[7..0] value of a binary "0000 1111" which corresponds to the first value of Table 2. Therefore, LOA is output as "000." Accordingly, the data can be transmitted to the system bus at once by using the 0th to 31st data lines.

Further, the LOA values of Table 2 can be grouped and data transmission can be performed successively. In other words, a misalignment support is possible. Bus controller 29 can be made up of a flexible programmable gate array (FPGA), and a circuit thereof can be easily changed. For example, a high speed processor of a specific manufacturer can be employed when speed of a processor board is considered. In addition, an input/output board of another manufacturer can be employed in consideration of compatibility with various equipment connected to the board, to thereby construct a total computer system. Such a constructed system can enhance performance and compatibility with other systems.

As described above, in a multi-processor system comprising a bus controller of the present invention, a bus controller converts a specific information signal (BM) into common information signals TT, TS and LOA so as to transmit and receive data. Thus, a bus transceiver that directly affects the overall function of a system is simplified and system bus stability can be enhanced. As a result, data transmission and reception between processor systems using different protocols is possible.

What is claimed is:

1. A multi-processor system provided with multiple processor boards having different protocols and sharing data via a system bus, each of said processor boards comprising:

a processor for transmitting and receiving a data signal together with a specific information signal that fits a specific protocol; and a bus control module for converting a byte mask signal to be assigned one bit per byte to designate validity of data output by said processor into a transfer size signal (TS), a transfer type signal (TT) for representing data transfer type, and a low-ordered address signal (LOA) for indicating a starting bit of valid data to be transmitted and transmitting the result to the system bus together with the data signal, when data is transferred from said processor to the system bus, and when data is transferred from the system bus to said processor, converting the TT, TS and LOA signals into a byte mask signal and transmitting the result to said processor together with the data signal, the TT signal including either a single transfer type signal in which data having a smaller size than a data line of the system bus is transferred, or a block transfer type in which data having a larger size than the data of the system bus is transferred.

* * * * *